United States Patent [19]
Paloniemi

[11] 3,718,437
[45] Feb. 27, 1973

[54] ISOTHERMAL CALORIMETER
[76] Inventor: Paavo Paloniemi, Poutamaentie 13 D., Helsinki 36, Finland
[22] Filed: Dec. 28, 1970
[21] Appl. No.: 101,765

[52] U.S. Cl. ..............................23/253 R, 73/190 R
[51] Int. Cl. ............................................G01n 25/20
[58] Field of Search.......................73/190 R, 193, 23/253 R, 253 PC

[56] References Cited

UNITED STATES PATENTS

| 3,505,024 | 4/1970 | Ishimaru | 23/253 R |
| 3,267,728 | 8/1966 | Solomons | 73/190 R |
| 3,379,061 | 4/1968 | Mercier | 73/190 R |
| 3,560,156 | 2/1971 | Teal | 23/253 PC |

OTHER PUBLICATIONS

Chemical Abstracts, 56: 10315 e (1962).

Primary Examiner—Morris O. Wolk
Assistant Examiner—Sidney Marantz
Attorney—Lackenbach & Lackenbach

[57] ABSTRACT

Isothermal calorimeter for the measurement of chemical reaction rate wherein a sample to be tested can be placed into a test chamber surrounded by a number of casings of a heat conductive material, said casings being insulated from each other by thermal insulating layers and being provided with separate temperature control systems in order to achieve good thermal stability in the system. The test chamber is connected to a gas feeding means through a gas channel means. The measurements are effected by means of a heat flow meter connected to the test chamber and to a metallic central mass.

20 Claims, 6 Drawing Figures

PATENTED FEB 27 1973 3,718,437

INVENTOR.
PAAVO PALONIEMI
By Jachenbach & Jachenbach
ATTORNEYS

ISOTHERMAL CALORIMETER

The invention relates to the field of devices for the measurement of chemical reaction rate and particularly to isothermal calorimeters.

When insulation materials age, their physical characteristics change until the material no longer stands the strain under the operating conditions. As a result, the insulation is damaged. In a study of the aging of the material, it is necessary to accelerate the testing by the use of higher temperatures than the operating temperature. By extrapolation from testing temperatures to the operating temperature, the endurance of the material is then estimated. The extrapolation usually extends over 20° to 40°C. and is based upon the equation of Arrhenius which gives a linear relation between the logarithm ($\log t$) of the endurance and the reciprocal value of the absolute temperature ($1/T$).

However, testing systems of this type are very expensive and a long time elapses before reliable results are obtained and yet there is a considerable risk of errors. Mainly, the risk lies in the extrapolation which implies that the aging reactions occur similarly at the operating temperature as at the testing temperature. This condition is not universal. Many different phenomena can take part in the aging process, such as oxidizing and hydrolytic reactions, as well as variations in the size of the molecules or crystallinity. The relative rates of these partial processes can vary according to the temperature and in such a case the extrapolation to an operating temperature is very unreliable.

Therefore, it is desirable to know if the aging reactions at the operating temperature correspond qualitatively to those at the testing temperatures and to get information on the relative reaction rates. Thus, the stability of the material can be better estimated at operating temperatures. Generally, the endurance of the material is proportional to the reciprocal value of the reaction rates.

The aging processes consist of chemical reactions and physical changes in the material. In both cases amounts of heat are liberated or absorbed in proportion to the reaction rates. Consequently, measurements of the reaction rate can be performed by measuring the corresponding heat effect. The results are, of course, relative and it is possible to compare only the reaction rates of the same material at different temperatures. On the other hand, the relative reaction rate curve as a function of temperature is just what is desired.

Many different reactions take part in the aging process. Therefore, the measurements of reaction rates give more information if different aging reactions are measured separately. In a controllable gas atmosphere, the aging reaction rate can be measured under the influence of either oxidation and hydrolysis, or without these. By such measurements it is possible to obtain a more complete view of the aging process.

Saito and Hino have measured the loss of material per unit of time by means of a mass spectrometer. This method is very sensitive and the measurements can also be performed at operating temperatures. The method has been developed very completely in Japan with good results. However, the method is very expensive, the mass spectrometer costing at least 40,000 dollars and, morever, the measurements require scientifically qualified personnel.

The disadvantage of these methods is that many physical processes, such as variations in the crystallinity, cannot be investigated.

Ranclino and Andreotti have developed the so-called "Oxygen Injection Method" for measurement of the oxidation rate of a test material. This testing method is a modification of the conventional D.T.A. measurement: the temperature of the test sample and the reference is increased at a constant rate of 1°C/min. The temperature difference between the test and reference samples is measured. Inert gas (nitrogen) streams into the test system and at certain moments the inert gas is replaced with oxygen. The rise of the temperature difference as a result of the oxidation reaction in the material is registered. Thus, the oxidation heat of the test material is obtained as a function of temperature.

Disadvantages of this system are that the test material must consist of very finely divided powder, the preparation of which can be difficult, so that the sensitivity is low, and that no other reactions can be measured but the oxidation.

Later, Andreotti used a conventional D.T.A. measurement with a test amount of 10 milligrams for a fast estimation of the material, but also here the sensitivity is too low; the extrapolation has to be effected over a temperature difference of up to 80°C.

It is one object of this invention to overcome said disadvantages and to create a rapid and accurate measurement device enabling the measurement of the reaction rate of a wide range of chemical reactions.

The isothermal calorimeter according to the invention has the following features:

The measurement is substantially performed at a constant temperature.

By using several ($n-1$) thermally conductive inner casing constructions which are thermally insulated from each other, a sufficiently stable temperature can be achieved in the innermost parts in which a sample is placed.

Every one of the parts which are substantially thermally insulated from the other parts is provided with a temperature control system of its own which can be disconnected, especially the innermost parts when the measuring temperature is almost achieved and when the best possible temperature stability is desired. It is advantageous if the set value of the temperature in those parts in which control is maintained increases gradually when moving from the outer casings inwards, e.g., 0.1° to 1°C/step.

To equilibrate the local temperature differences, there can be arranged between the above casings intermediate casings made of a thermally conductive material, each connected to one of the above casings. For measurement of the reaction rate, a heat flow meter of known type is used, by which the thermal effect developed and absorbed during the reaction is measured, almost all of the thermal energy developed or absorbed during the reaction is conducted away from the sample or to the sample via the heat flow meter.

If desired, the measurement can be performed as a differential measurement by simultaneously measuring the thermal effect developed in the sample and the thermal effect produced by a reference sample consisting of an inert material and by evaluating the difference.

A large sample, weighing generally from approximately 1 to 100 grams, is used.

A large heat flow meter is used the cross-sectional area of which generally is from 1 to 50 cm².

The gas atmosphere of the test chamber is obtained and maintained by conducting thereto, via tubes having a substantially low heat conductivity, a suitable gas mixture, e.g., air, an oxygen-nitrogen mixture, nitrogen, or any of the aforementioned gases suitably moistened. Also other and even chemically very aggressive gases can be made use of provided the choice of material for the device is proper. The gas tubes have to be arranged in loops in the spaces between the layers, and/or they can be thermally connected to the layers to a sufficient degree for the heating of the gas to the test temperature before it enters the test chambers.

The innermost parts of the device can contain space for more than one test and/or reference sample.

By the construction according to the present invention a high sensitivity of measuring can be obtained, e.g., the aging reaction rate of electrical insulation materials within the operation temperature range can be measured. After the endurance of the insulation has been determined at a higher temperature by conventional methods, the endurance at the operating temperature can be determined by the reaction rate measurement according to the present invention since the endurance is mostly inversely proportional to the aging reaction rate.

Thanks to the high sensitivity of the measurement, it is possible to dispense with the uncertain determination of endurance which has been used until now by means of extrapolation and which has required laborious and time-consuming experiments.

Furthermore, the duration of the measurement is substantially shorter than that of other methods. Instead of $10^4$ to $10^5$ hours at operating temperatures, the determination of the reaction rate requires 2 to 20 hours, depending on the standard of the equipment and on the speed at which the reaction equilibrium is achieved.

Since the gas atmosphere of the test chamber is adjustable, e.g., different partial aging reactions of insulation materials can be measured separately so that a more complete view of the aging process is obtainable than heretofore.

The large test chamber makes it possible to study all types of materials, such as films, layers, and powders, even in fluid form, if the sample holder has a proper construction.

Other objects and advantages will appear from the following description of examples of the invention, when considered in connection with the accompanying drawing, and the novel features will be particularly pointed out in the appended claims.

Figure 1:
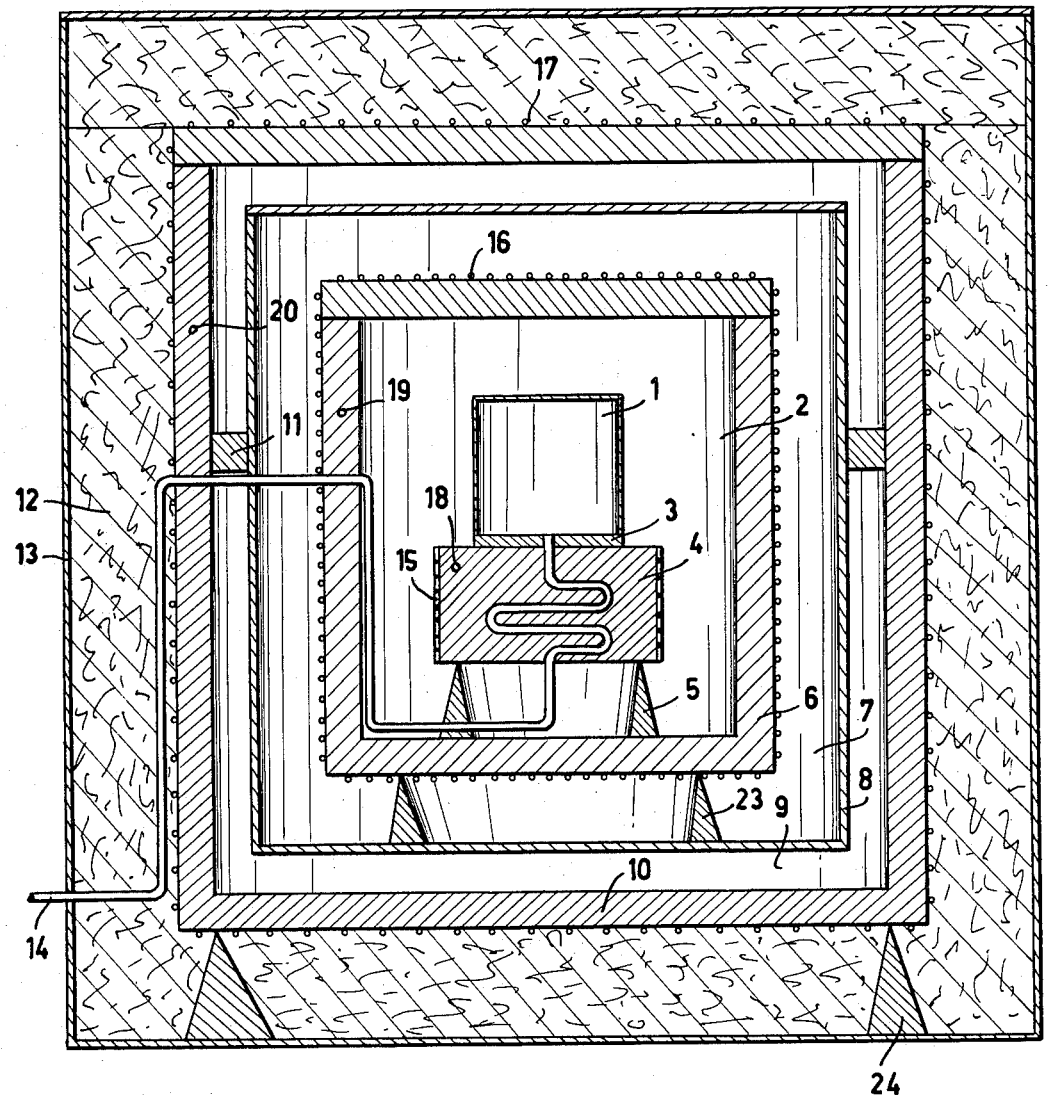
FIG. 1 is a cross-sectional view of one embodiment of the invention having one test chamber.

FIG. 1 shows one construction according to the invention. The material(s) to be analyzed is (are) enclosed in a test chamber 1, surrounded by a thermal insulation 2, e.g. air, on all sides except on that of the heat flow meter 3. The heat flow meter 3 is further connected to a thermally conductive central mass 4 of e.g., aluminum, also surrounded by the thermal insulation 2. The test chamber 1 and the central mass 4 are surrounded by an inner casing 6 which in its turn is thermally insulated by a layer 7 (e.g., air) from an intermediate layer 8 which is insulated from an outer casing 10 in all other parts 9 except at support elements 11. (The support elements 11 can be made, e.g., of aluminum or of a thermally insulating material, such as ceramics, the form being, e.g., a circular holder according to FIG. 1). All the casings 6, 8 and 10 have good thermal conductivity and are made of, e.g., aluminum. The outer casing 10 is further thermally insulated from the outside space. The thermal insulation 12 can consist of, e.g., glass wool. The outer wall 13 of the thermal insulation 12 forms the outer wall of the device which can be made of metal or other sufficiently stable material.

The supports 5, 23, 24 of the central mass 4 and the casings 6, 10 are made of thermally insulating material, e.g., ceramics, or of alternating layers of metal and thermally insulating material, the result being a poor thermal conductivity through said supports 5, 23, 24.

The gas atmosphere of the test chamber is obtained by conducting gas thereto through a tube 14. The gas is preheated in the tube 14 which first extends for some distance alongside of the outer casing 10, and then against the wall of the inner casing 6, and, finally, is embedded in the central mass 4. The tube 14 has to consist of a relatively thermally insulating material in order not to cause large local temperature differences in the casings 10, 6, nor in the central mass 4. Possible materials are polytetrafluoroethylene or a thin capillary tube of, e.g., stainless steel.

The gas outlet can be an opening in the test chamber wall or an outlet tube similar in material and in positioning to the inlet tube. The gas channel means is connected to a suitable gas feeding means (not shown), such as a gas pump or a pressurized gas tank.

The parts thermally insulated from each other are provided with heating resistor elements 15, 16, 17 and with temperature measuring elements 18, 19, 20, respectively. The central mass 4 and the temperature is controlled only when changing from one test temperature to another, and the aim is to bring the temperature of the central mass quickly near its final value, i.e., the temperature of the innermost casing. Thus, the element 18 measuring the temperature of the central mass can advantageously be, e.g., a thermocouple or a resistor element pair or a thermistor pair in bridge connection, which measures the temperature difference between the central mass and the innermost casing. The other temperature measuring elements are preferably devices measuring the absolute temperature, e.g., resistor elements or thermistors.

Since the temperature of the casings 6 and 7 is controlled continuously, the local uniformity of their temperature is of great significance. Therefore, their heating resistor elements 16, 17 are placed substantially evenly on their outer surfaces.

To obtain a sufficient temporal temperature stability, sensitive and stable measuring elements have to be used, e.g., platinum wire resistors or thermistors of high quality, as well as high performance electronics for the amplification of the temperature signal voltage. Otherwise conventional principles can be used in controlling the temperature.

The heat flow meter 3 which transforms the heat flow passing through it to a voltage is a device of known type and meters having a sensitivity of 0.1 to 1 V/W are commercially available. For the measurement of the output voltage of the meter, a sufficiently sensitive microvoltmeter is required, such meters being also commercially available, the most sensitive range being, e.g., 1 $\mu$V corresponding to full scale.

The following modifications can be considered within the scope of the invention.

The number of casings the temperature of which is controlled can be chosen arbitrarily (1 to $n$). Two casings are, however, the most preferred number (FIG. 1).

There can be 0 to $2n$ intermediate casings 8, in principle one inside and/or one outside of each temperature controlled casing. The most favorable number of intermediate casings is 2; except the intermediate casing shown in FIG. 1, there could be another one inside the innermost casing 6.

Figure 3:
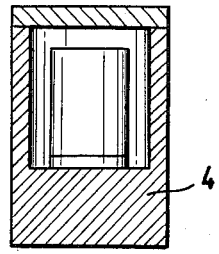
FIG. 3 shows an arrangement wherein the test chamber is surrounded by the central mass.
Figure 4:
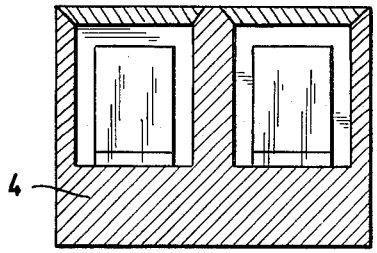
FIG. 4 shows an arrangement with two test chambers separately surrounded by one central mass.
Figure 5:
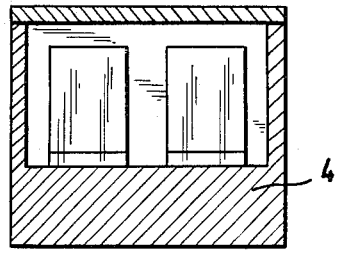
FIG. 5 shows an arrangement with two test chambers surrounded by one central mass and with no wall between the test chambers.
Figure 6:
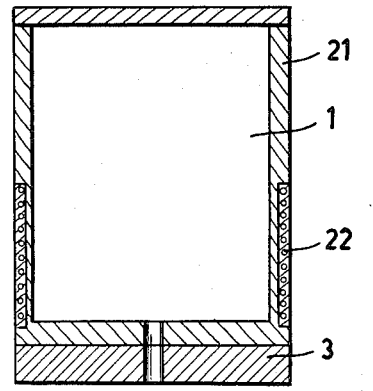
FIG. 6 shows a test chamber arrangement with separate heating resistor elements.

The central mass can be open as shown in FIG. 1 or it can surround the test chamber as shown in FIGS. 3, 4, and 5.

Figure 2:
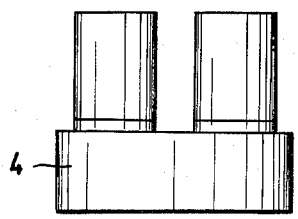
FIG. 2 shows an arrangement with one central mass and two test chambers.

There can be more test chambers than one. In FIGS. 2, 4 and 5 two test chambers are shown. On the same principles the number of test chambers can be increased.

When there are more test chambers than one, differential measurement can be used, i.e., measurement of the output difference between two heat flow meters. If the other test chamber contains a non-reactive material, exterior disturbances can be eliminated. The test chambers can also contain the same material, but a different gas atmosphere, whereby different partial reactions can be analyzed.

Even the test chambers can be provided with a heating resistor elements of their own, e.g., as shown in FIG. 3. The walls 21 of the test chamber are made of, e.g., aluminum and a heating resistor element 22 is embedded in the wall or fastened on the surface thereof. The heat flow meter of the test chamber can preferably be used as a measuring element for the temperature difference between the test chamber and the central mass because it indicates the temperature difference between the test chamber and the central mass. This makes a change from one test temperature to another faster than was earlier possible.

The form and positions of the supports 5, 23, 24 between the casings, the intermediate casings, and the central mass can differ from that of FIG. 1 without any effect on the performance of the device.

Of course, the device according to the present invention is not applicable only to electric insulation materials and their aging. This device can be used everywhere where slowly proceeding reactions, or reactions near the equilibrium state are to be analyzed, e.g., in organic chemistry and biology.

What I claim is:

1. Isothermal calorimeter for measurement of chemical reaction rate, comprising
   a. at least one test chamber;
   b. a central mass
   c. at least one heat flow meter mounted between the test chamber and the central mass;
   d. a first thermal insulation layer surrounding the test chamber, the central mass, and the heat flow meter;
   e. an inner casing surrounding the first thermal insulation layer;
   f. a number of outer casings surrounding the inner casing and each other;
   g. a number of outer thermal insulation layers separating the inner casing and the outer casings from each other;
   h. gas channel means passing through all the casings and the thermal insulation layers, the central mass, and entering into the test chamber;
   i. first heating elements connected to the different casings respectively;
   j. second heating elements connected to the central mass; and
   k. means for separately controlling the temperatures of the different casings and the central mass to enable switching off of the temperature control and heating elements for the central mass and of a number of the casings, leaving at least one of the casings controlled.

2. Isothermal calorimeter as claimed in claim 1, further comprising gas outlet means.

3. Isothermal calorimeter as claimed in claim 1, wherein the thermal insulation consists of air.

4. Isothermal calorimeter as claimed in claim 1, wherein the outermost thermal insulation consists of a layer of glass-wool.

5. Isothermal calorimeter as claimed in claim 1, wherein the casings are made of a thermally conductive material, such as metal.

6. Isothermal calorimeter as claimed in claim 1, wherein the number of the outer casings is one.

7. Isothermal calorimeter as claimed in claim 1, wherein the number of the intermediate casings is two.

8. Isothermal calorimeter as claimed in claim 1 further comprising an outer wall surrounding the last of the outer casings.

9. Isothermal calorimeter as claimed in claim 1, wherein successive casings are separated from each other by means of support elements.

10. Isothermal calorimeter as claimed in claim 1, wherein the central mass is separated from the inner casing by means of support elements.

11. Isothermal calorimeter as claimed in claim 1, wherein the central mass surrounds the test chamber.

12. Isothermal calorimeter as claimed in claim 1, wherein the number of the test chambers is at least two.

13. Isothermal calorimeter as claimed in claim 1, wherein the test chamber is provided with separate heating resistor elements.

14. Isothermal calorimeter as claimed in claim 1 further comprising a number of intermediate casings arranged between two successive casings.

15. Isothermal calorimeter as claimed in claim 14, wherein each intermediate casing is thermally connected to one of said successive casings.

16. Isothermal calorimeter as claimed in claim 1, wherein the gas channel means consist of at least one tube of a material with low thermal conductivity, said tube being arranged in loops following the walls of the different casings.

17. Isothermal calorimeter as claimed in claim 16, wherein the tube is arranged in loops within the central mass.

18. Isothermal calorimeter as claimed in claim 1, further comprising a gas feeding means.

19. Isothermal calorimeter as claimed in claim 18, wherein said gas channel means is connected to said gas feeding means.

20. Isothermal calorimeter as claimed in claim 19, wherein the number of the intermediate casings is one.

* * * * *